(12) United States Patent
Schwartz et al.

(10) Patent No.: US 8,972,164 B2
(45) Date of Patent: *Mar. 3, 2015

(54) COLLABORATIVE ROBOT MANIFOLD TRACKER

(71) Applicants: Ira B. Schwartz, Bethesda, MD (US); Mong-ying Ani Hsieh, Marlton, NJ (US); Eric Forgoston, Livingston, NJ (US)

(72) Inventors: Ira B. Schwartz, Bethesda, MD (US); Mong-ying Ani Hsieh, Marlton, NJ (US); Eric Forgoston, Livingston, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,796

(22) Filed: Apr. 23, 2013

(65) Prior Publication Data

US 2013/0283926 A1    Oct. 31, 2013

Related U.S. Application Data

(60) Provisional application No. 61/638,694, filed on Apr. 26, 2012.

(51) Int. Cl.
*G01C 21/12* (2006.01)
*G01F 1/00* (2006.01)
*G06F 17/00* (2006.01)
*G01P 5/00* (2006.01)

(52) U.S. Cl.
CPC  *G01F 1/00* (2013.01); *G06F 17/00* (2013.01); *G01P 5/00* (2013.01)
USPC ........................................... 701/400

(58) Field of Classification Search
CPC ....... Y02T 70/70; Y02T 50/84; G01C 21/203
USPC .......................................................... 701/400
See application file for complete search history.

(56) References Cited

U.S. PATENT DOCUMENTS 6,269,763 B1 *   8/2001   Woodland ..................... 114/382
2012/0029824 A1 *   2/2012   Wilson .............................. 702/3

OTHER PUBLICATIONS

Hsieh et al., Robotic Manifold Tracking of Coherent Structures in Flows, Apr. 20, 2012, pp. 1-6.*

(Continued)

*Primary Examiner* — James Trammell
*Assistant Examiner* — Michael D Lang
(74) *Attorney, Agent, or Firm* — US Naval Research Laboratory; L. George Logg

(57) ABSTRACT

A collaborative control method for tracking Lagrangian coherent structures (LCSs) and manifolds on flows employs at least three autonomous sensors each equipped with a local flow sensor for sensing flow in a designated fluid medium, e.g. water or air. A first flow sensor is a tracking sensor while the other sensors are herding sensors for controlling and determining the actions of the tracking sensor. The tracking sensor is positioned with respect to the herding sensors in the fluid medium such that the herding sensors maintain a straddle formation across a boundary; obtaining a local fluid flow velocity measurement from each sensor. A global fluid flow structure is predicted based on the local flow velocity measurements. In a water medium, mobile autonomous underwater flow sensors may be deployed with each tethered to a watersurface craft.

4 Claims, 5 Drawing Sheets

(56) References Cited

OTHER PUBLICATIONS

C. Hsieh, Z. Jin, D. Marthaler, B. Nguyen, D. Tung, A. Bertozzi, and R. Murray, "Experimental validation of an algorithm for cooperative boundary tracking," Proceedings of the 2005 American Control Conference, pp. 1078-1083, 2005.

S. Susca, S. Martinez, and F. Bullo, "Monitoring environmental boundaries with a robotic sensor network," IEEE Trans. on Control Systems Technology, vol. 16, No. 2, pp. 288-296, 2008.

I. Triandaf and I. B. Schwartz, "A collective motion algorithm for tracking time-dependent boundaries," Mathematics and Computers in Simulation, vol. 70, pp. 187-202, (2005).

V. M. Goncalves, L C. A. Pimenta, C. A. Maia, B. Dutra, and G. A. S. Pereira, "Vector fields for robot navigation along time-varying curves in n-dimensions," IEEE Trans. on Robotics, vol. 26, No. 4, pp. 647-659 (2010), for static and time-dependent cases respectively.

Kalantar Kashi, S & Zimmer, U 2007, "Distributed shape control of homogeneous swarms of autonomous underwater vehicles", Autonomous Robots, vol. 22, pp. 37-53.

* cited by examiner

COLLABORATIVE ROBOT MANIFOLD TRACKER

CROSS-REFERENCE TO RELATED APPLICATIONS

This application claims the benefit of U.S. Provisional Application 61/638,694 filed on Apr. 26, 2012, and incorporated herein by reference.

FIELD OF THE INVENTION

The invention is directed to tracking coherent structures and manifolds on flows in a designated fluid medium, and in particular to deploying mobile autonomous underwater flow sensors, e.g. each tethered to a watersurface craft, to track stable/unstable manifolds of general 2D conservative flows through local sensing alone.

BACKGROUND OF THE INVENTION

In realistic ocean flows, time-dependent coherent structures, or Lagrangian coherent structures (LCS), are similar to separatrices that divide the flow into dynamically distinct regions. LCS are extensions of stable and unstable manifolds to general time-dependent flows (see, e.g., G. Haller and G. Yuan, "Lagrangian coherent structures and mixing in two-dimensional turbulence," Phys. D, vol. 147, pp. 352-370 (December 2000)) and they carry a great deal of global information about the dynamics of the flows.

For two-dimensional (2D) flows, LCS are analogous to ridges defined by local maximum instability, and can be quantified by local measures of Finite-Time Lyapunov Exponents (FTLE) (S. C. Shadden, F. Lekien, and J. Marsden, "Definition and properties of Lagrangian coherent structures from finite-time Lyapunov exponents in two-dimensional aperiodic flows," Physica D: Nonlinear Phenomena, vol. 212, no. 3-4, pp. 271-304 (2005)). Recently, LCS have been shown to coincide with optimal trajectories in the ocean which minimize the energy and the time needed to traverse from one point to another (see, e.g., T. Inane, S. Shadden, and J. Marsden, "Optimal trajectory generation in ocean flows," in Proceedings of the 2005 American Control Conference, pp. 674-679, 2005, and C. Senatore and S. Ross, "Fuel-efficient navigation in complex flows," in Proceedings of the 2008 American Control Conference, pp. 1244-1248, 2008). Furthermore, to improve weather and climate forecasting, and to better understand various physical, chemical, and geophysical processes in the ocean, there has been significant interest in the deployment of autonomous sensors to measure a variety of quantities of interest. One drawback to operating sensors in time-dependent and stochastic environments like the ocean is that the sensors will tend to escape from their monitoring region of interest. Since the LCS are inherently unstable and denote regions of the flow where more escape events may occur (see, e.g., E. Forgoston, L. Billings, P. Yecko, and I. B. Schwartz, "Set-based corral control in stochastic dynamical systems: Making almost invariant sets more invariant," Chaos, vol. 21, 013116, 2011), knowledge of the LCS are of paramount importance in maintaining a sensor in a particular monitoring region.

Existing work in cooperative boundary tracking for robotic teams that relies on one-dimensional (1D) parameterizations include C. Hsieh, Z. Jin, D. Marthaler, B. Nguyen, D. Tung, A. Bertozzi, and R. Murray, "Experimental validation of an algorithm for cooperative boundary tracking," in Proceedings of the 2005 American Control Conference, pp. 1078-1083, 2005, S. Susca, S. Martinez, and F. Bullo, "Monitoring environmental boundaries with a robotic sensor network," IEEE Trans. on Control Systems Technology, vol. 16, no. 2, pp. 288-296, 2008, I. Triandaf and I. B. Schwartz, "A collective motion algorithm for tracking time-dependent boundaries," Mathematics and Computers in Simulation, vol. 70, pp. 187-202, (2005) and V. M. Goncalves, L. C. A. Pimenta, C. A. Maia, B. Dutra, and G. A. S. Pereira, "Vector fields for robot navigation along time-varying curves in n-dimensions," IEEE Trans. on Robotics, vol. 26, no. 4, pp. 647-659 (2010), for static and time-dependent cases respectively. Formation control strategies for distributed estimation of level surfaces and scalar fields in the ocean are presented in F. Zhang, D. M. Fratantoni, D. Paley, J. Lund, and N. E. Leonard, "Control of coordinated patterns for ocean sampling," Int. Journal of Control, vol. 80, no. 7, pp. 1186-1199 (2007), K. M. Lynch, P. Schwartz, I. B. Yang, and R. A. Freeman, "Decentralized environmental modeling by mobile sensor networks," IEEE Trans. on Robotics, vol. 24, no. 3, pp. 710-724 (2008), and W. Wu and F. Zhang, "Cooperative exploration of level surfaces of three dimensional scalar fields," Automatica, the IFAC Journal, vol. 47, no. 9, pp. 2044-2051 (2011), and pattern formation for surveillance and monitoring by robot teams is discussed in J. Spletzer and R. Fierro, "Optimal positioning strategies for shape changes in robot teams," in Proceedings of the IEEE Int. Conf. on Robotics & Automation, Barcelona, Spain pp. 754-759, 2005, S. Kalantar and U. R. Zimmer, "Distributed shape control of homogeneous swarms of autonomous underwater vehicles," Autonomous Robots (intl. journal), 2006, and M. A. Hsieh, S. Loizou, and V. Kumar, "Stabilization of multiple robots on stable orbits via local sensing," in Proceedings of the Int. Conf. on Robotics & Automation (ICRA), 2007).

BRIEF SUMMARY OF THE INVENTION

According to the invention, a collaborative control method for tracking Lagrangian coherent structures (LCSs) and manifolds on flows employs at least three autonomous sensors each equipped with a local flow sensor for sensing flow in a designated fluid medium, e.g. water or air. A first flow sensor is a tracking sensor while the other sensors are herding sensors for controlling and determining the actions of the tracking sensor. The tracking sensor is positioned with respect to the herding sensors in the fluid medium such that the herding sensors maintain a straddle formation across a boundary; obtaining a local fluid flow velocity measurement from each sensor. A global fluid flow coherent structure is predicted based on the local flow velocity measurements. In a water medium, mobile autonomous underwater flow sensors may be deployed with each tethered to a watersurface craft.

The invention advantageously uses cooperative robots to find coherent structures without requiring a global picture of the ocean dynamics, and enables a team of robots to track the stable/unstable manifolds of general 2D conservative flows through local sensing alone. The invention provides tracking strategies for mapping LCS in the ocean using AUVs, using nonlinear dynamical and chaotic system analysis techniques to create a tracking strategy for a team of robots. The cooperative control strategy leverages the spatio-temporal sensing capabilities of a team of networked robots to track the boundaries separating the regions in phase space that support distinct dynamical behavior. Additionally, boundary tracking relies solely on local measurements of the velocity field. The method of the invention may be generally applied to any conservative flow.

DETAILED DESCRIPTION OF THE INVENTION

Figure 1:
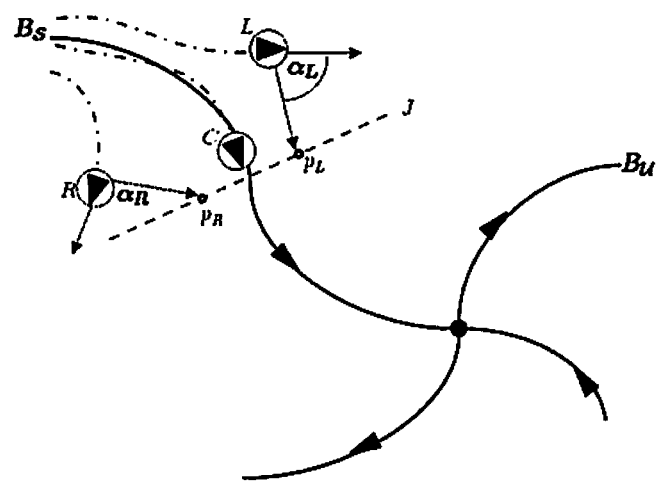
FIG. 1 shows three robots tracking the stable structure $B_S$ in a conservative vector field according to the invention.

We consider the problem of controlling a team of N planar autonomous underwater vehicles ("AUVs") or mobile autonomous underwater flow sensors, e.g. where each underwater flow sensor is tethered to a mobile autonomous water-surface craft, to collaboratively track the material lines that separate regions of flow with distinct fluid dynamics. This is similar to the problem of tracking the stable (and unstable) manifolds of a general nonlinear dynamical system where the manifolds separate regions in phase space with distinct dynamical behaviors. We assume the following 2D kinematic model for each of the AUVs:

$$dx_i/dt = V_i \cos \theta_i + u_i, \quad (1a)$$

$$dy_i/dt = V_i \sin \theta_i + v_i, \quad (1b)$$

where $x_i = [x_i, y_i]^T$ is the vehicle's planar position, $V_i$ and $\theta_i$ are the vehicle's linear speed and heading, and $u_i = [u_i, v_i]^T$ is the velocity of the fluid current experienced/measured by the $i^{th}$ vehicle. Additionally, we assume each agent can be circumscribed by a circle of radius r, i.e., each vehicle can be equivalently described as a disk of radius r.

In this work, $u_i$ is provided by a 2D planar conservative vector field described by a differential equation of the form $$dx/dt = F(x). \quad (2)$$

In essence, $u_i = F_x(x_i)$ and $v_i = F_y(x_i)$. Let $B_S$ and $B_U$ denote the stable and unstable manifolds of Eq. (2). In general, $B_S$ and $B_U$ are the separating boundaries between regions in phase space with distinct dynamics. For 2D flows, $B_*$ are simply one-dimensional curves where * denotes either stable (S) or unstable (U) boundaries. For a small region centered about a point on $B_*$, the system is unstable in one dimension. Finally, let $\rho(B_*)$ denote the radius of curvature of $B_*$ and assume that the minimum of the radius of curvature $\rho_{min}(B_*) > r$. This last assumption is needed to ensure the robots do not lose track of the $B_*$ due to sharp turns.

The objective is to develop a collaborative strategy to enable a team of robots to track $B_*$ in general 2D planar conservative flow fields through local sampling of the velocity field. While the focus is on the development of a tracking strategy for $B_S$, the method can be easily extended to track $B_U$ since $B_U$ are simply stable manifolds of Eq. (2) for t<0.

The PIM Triple Procedure

The method of the invention originates from the Proper Interior Maximum (PIM) Triple Procedure, H. E. Nusse and J. A. Yorke, "A procedure for finding numerical trajectories on chaotic saddles," Physica D Nonlinear Phenomena, vol. 36, pp. 137-156, 1989 (hereinafter "Nusse et al.")—a numerical technique designed to find stationary trajectories in chaotic regions with no attractors. While the original procedure was developed for chaotic dynamical systems, the approach can be employed to reveal the stable set of a saddle point of a general nonlinear dynamical system. The procedure consists of iteratively finding an appropriate PIM Triple on a saddle straddling line segment and propagating the triple forward in time.

Given the dynamical system described by Eq. (2), let $D \in R^2$ be a closed and bounded set such that D does not contain any attractors of Eq. (2). Given a point $x \in D$, the escape time of x, denoted by $T_E(x)$, is the time x takes to leave the region D under the differential map given by Eq. (2).

Let J be a line segment that crosses the stable set $B_S$ in D, i.e., the endpoints of the J are on opposite sides of $B_S$. Let $\{x_L, x_C, x_R\}$ denote a set of three points in J such that $x_C$ denotes the interior point. Then $\{x_L, x_C, x_R\}$ is an Interior Maximum triple if $T_E(x_C) > \max\{T_E(x_L), T_E(x_R)\}$. Furthermore, $\{x_L, x_C, x_R\}$ is a Proper Interior Maximum (PIM) triple if it is an interior maximum triple and the interval $[x_L, x_R]$ in J is a proper subset off. Then the numerical computation of any PIM triple can be obtained iteratively starting with an initial saddle straddle line segment $J_0$. Let $x_{L0}$ and $X_{R0}$ denote the endpoints of $J_0$ and apply an $\epsilon_0 > 0$ discretization of $J_0$ such that $x_{L0} = q_0 < q_1 < \ldots < q_M = x_{R0}$. For every point $q_i$, determine $T_E(q_i)$ by propagating $q_i$ forward in time using Eq. (2). Then the PIM triple in $J_0$ is given by the points $\{q_{k-1}, q_k, q_{k+1}\}$ where $q_k = \text{argmax}_{i=1, \ldots, M} T_E(q_i)$ This PIM triple can then be further refined by choosing $J_1$ to be the line segment containing $\{q_{k-1}, q_k, q_{k+1}\}$ and reapplying the procedure with another $\epsilon_1 > 0$ discretization where $\epsilon_1 < \epsilon_0$.

Given an initial saddle straddling line segment $J_0$, it has been shown that the line segment given by any subsequent PIM triple on $J_0$ is also a saddle straddling line segment [H. E. Nusse and J. A. Yorke, "A procedure for finding numerical trajectories on chaotic saddles," Physica D Nonlinear Phenomena, vol. 36, pp. 137-156, 1989.]. Furthermore, if we use a PIM triple $x(t) = \{x_L, x_C, x_R\}$ as the initial conditions for the dynamical system given by Eq. (2) and propagate the system forward in time by $\Delta t$, then the line segment containing the set $x(t + \Delta t)$, $J_{t+\Delta t}$, remains a saddle straddle line segment. As such, the same numerical procedure can be employed to determine an appropriate PIM triple on $J_{t+\Delta t}$. This procedure can be repeated to eventually reveal the entire stable set $B_S$ and unstable set $B_U$ within D if time was propagated forwards and backwards respectively. Furthermore, since the procedure always begins with a valid saddle straddling line segment, by construction, the procedure always results in a non-empty set.

Building upon the PIM Triple Procedure, as described below the invention utilizes a cooperative saddle straddle control strategy for a team of N≥3 robots to track the stable (and unstable) manifolds of a general conservative time-independent flow field F(x). The invention differs from the PIM procedure where it relies solely on information gathered via local sensing and shared through the network. In contrast, a straight implementation of the PIM Triple Procedure necessitates global knowledge of the structure of the system dynamics throughout a given region given its reliance on computing escape times.

Controller Synthesis

Consider a team of three robots and identify them as robots {L,C,R}. While the robots may be equipped with similar sensing and actuation capabilities, we propose a heterogeneous cooperative control strategy.

Let $x(0) = [x_L^T(0), x_C^T(0), x_R^T(0)]^T$ be the initial conditions for the three robots. Assume that $x(0)$ lies on the line segment $J_0$ where $J_0$ is a saddle straddle line segment and $\{x_L(0), x_C(0), x_R(0)\}$ constitutes a PIM triple. Similar to the PIM Triple Procedure, the objective is to enable the robots to maintain a formation such that a valid saddle straddle line segment can be maintained between robots L and R. Instead of computing the escape times for points on $J_O$ as proposed by the PIM Triple Procedure, robot C must remain close to $B_S$ using only local measurements of the velocity field provided by the rest of the team. As such, we refer to robot C as the tracker of the team while robots L and R maintains a straddle formation across the boundary at all times. Robots L and R may be thought of herding robots, since they control and determine the actions of the tracking robot.

Straddling Formation Control

The controller for the straddling robots consists of two discrete states: a passive control state, $U_P$, and an active control state, $U_A$. The robots initialize in the passive state $U_P$ where the objective is to follow the flow of the ambient vector field. Therefore, $V_i=0$ for i=L,R. Robots execute $U_P$ until they reach the maximum allowable separation distance $d_{Max}$ from robot C. When $\|x_i-x_C\|>d_{max}$ robot i switches to the active control state, $U_A$, where the objective is to navigate to a point $p_i$ on the current projected saddle straddle line segment $\hat{J}_t$ such that, $\|p_i-p_C\|=d_{Min}$ and $p_C$ denotes the midpoint of $\hat{J}_t$. When robots execute $U_A$, $V_i \|p_i-x_i-u_i\|$ and $\theta_i(t)=\alpha_i(t)$ where $\alpha_i$ is the angle between the desired, $(p_i-x_i)$, and current heading, $u_i$, of robot i as shown in FIG. 1. In summary, the straddling control strategy for robots L and R is given by $$V_i = \begin{cases} 0 & \text{if } d_{Min} < \|x_i - x_C\| < d_{Max} \\ \|(p_i - x_i) - u_i\| & \text{otherwise,} \end{cases} \quad (3a)$$

$$\theta_i = \begin{cases} 0 & \text{if } d_{Min} < \|x_i - x_C\| < d_{Max} \\ \alpha_i & \text{otherwise.} \end{cases} \quad (3b)$$

We note that while the primary control objective for robots L and R is to maintain a straddle formation across $B_S$, robots L and R are also constantly sampling the velocity of the local vector field and communicating these measurements and their relative positions to robot C. Robot C is then tasked to use these measurements to track the position of $B_S$.

Manifold Tracking Control

Let $\hat{u}_L(t)$, $\hat{u}_C(t)$, and $\hat{u}_C(t)$ denote the current velocity measurements obtained by robots L, C, and R at their respective positions. Let $d(\cdot,\cdot)$ denote the Euclidean distance function and assume that $d(x_C,B_S)<\epsilon$ such that $\epsilon>0$ is small. Given the straddle line segment $J_t$ such that $x_L(k)$ and $x_R(k)$ are the endpoints of $J_t$, we consider an $\epsilon_t<\epsilon$ discretization of $J_t$ such that $x_L=q_1<q_2<\ldots<q_M=x_R$. The objective is to use the velocity measurements provided by the team to interpolate the vector field at the points $q_1, \ldots, q_M$. Since Eq. (2) has $C^1$ continuity and if $x_C$ is $\epsilon$-close to $B_S$, then the point $q_B=\text{argmax}_{k=1,\ldots,M} u(q_k)^T \hat{u}_C(t)$ should be $\delta$-close to $B_S$ where $\epsilon<\delta<A$ and A is a small enough positive constant.

While there are numerous vector field interpolation techniques available (J. C. Agui and J. Jimenez, "On the performance of particle tracking," Journal of Fluid Mechanics, vol. 185, pp. 447-468, 1987, and E. J. Fuselier and G. B. Wright, "Stability and error estimates for vector field interpolation and decomposition on the sphere with rbfs," SIAM J. Numer. Anal., vol. 47, pp. 3213-3239, 2009), we employ the inverse distance weighting method. For a given set of velocity measurements $\hat{u}_i(t)$ and corresponding position estimates $\hat{x}_i(t)$, the velocity vector at some point $q_k$ is given by $$u(q_k) = \sum_j \sum_{i=1}^N \frac{w_{ij} \hat{u}_i(j)}{\sum_j \sum_{i=1}^N w_{ij}}$$

where $w_{ij}=\|\hat{x}_i(j)-q_i\|^{-2}$. Rather than rely solely on the current measurements provided by the three robots, it is possible to include the recent history of $\hat{u}_i(t)$ to improve the estimate of $u(q_k)$, i.e., $\hat{u}_i(t-\Delta T)$, $\hat{u}_i(t-2\Delta T)$, and so on, where $\Delta T$ is the sampling period and i={L,C,R}. Thus, the control strategy for the tracking robot C is given by $$V_C=\|[(q_B+b\hat{u}_B)-x_C]-u_C\| \quad (4a)$$

$$\theta_C=\beta_C \quad (4b)$$

where $\beta_C$ denotes the difference in the heading of robot C and the vector $(q_B-\hat{u}_B)$ and b>r is a small number. The term $b\hat{u}_B$ is included to ensure that the control strategy aims for a point in front of robot C rather than behind it. As such, the projected saddle straddle line segment $\hat{J}_t$ at each time step is given by $p_c=q_C+bu_C$ with $\hat{J}_t$ orthogonal to $B_S$ at $q_C$ and $\|\hat{J}_t\|$ chosen to be in the interval $[2d_{Min} 2d_{Max}]$.

Analysis

Regarding the implementation of the saddle straddle control strategy, we begin with the following key assumption on the robots' initial positions.

Assumption 1 Given a team of three robots {L,C,R}, assume that $d(x_C(0),B_S)<\epsilon$ for a small value of $\epsilon>0$, $\|x_L-x_C\|=\|x_R-x\|=d_{Min}$ with $d_{Min}>2r$, and robots L and R are on opposite sides of $B_S$.

In other words, assume that the robots initialize in a valid PIM triple formation and their positions form a saddle straddle line segment orthogonal to $B_S$. Our main result concerns the validity of the saddle straddle control strategy.

Theorem 1 Given a team of 3 robots with kinematics given by Eq. (1) and $u_i$ given by Eq. (2), the feedback control strategy Eq. (3) and Eq. (4) maintains a valid saddle straddle line segment in the time interval $[t,t+\Delta t]$ if the initial positions of the robots, $x(t)$, is a valid PIM triple.

The above theorem guarantees that for any given time interval $[t,t+\Delta t]$ the team maintains a valid PIM triple formation. As such, the iterative application of the proposed control strategy leads to the following proposition.

Proposition 1 Given a team of 3 robots with kinematics given by Eq. (1) and $u_i$ given by Eq. (2), the feedback control strategy results in an estimate of $B_S$ denoted as $\hat{B}_S$, such that $<B_S, \hat{B}_S>_{L2}<W$ for some W>0 where $<\cdot,\cdot>_{L2}$ denotes the inner product (which provides an $L_2$ measure between the $B_S$ and $\hat{B}_S$ curves).

From Theorem 1, since the team is able to maintain a valid PIM triple formation across $B_S$ for any given time interval $[t,t+\Delta t]$, this ensures that an estimate of $B_S$ in the given time interval also exists. Applying this reasoning in a recursive fashion, one can show that an estimate of $B_S$ can be obtained for any arbitrary time interval. Preferably, one also determines the bound on W such that $\hat{B}_S$ results in a good enough approximation since W depends on the sensor and actuation noise, the vector interpolation routine, the sampling frequency, and the time scales of the flow dynamics.

Results

Figure 2A:
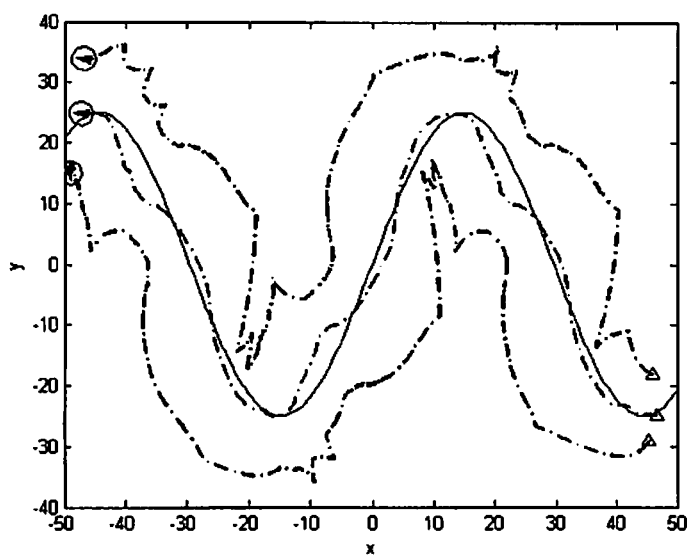
FIGS. 2A-B show trajectories of 3 robots tracking a sinusoidal boundary (FIG. 2A) and a star-shaped boundary (FIG. 2B) according to the invention.
Figure 2B:
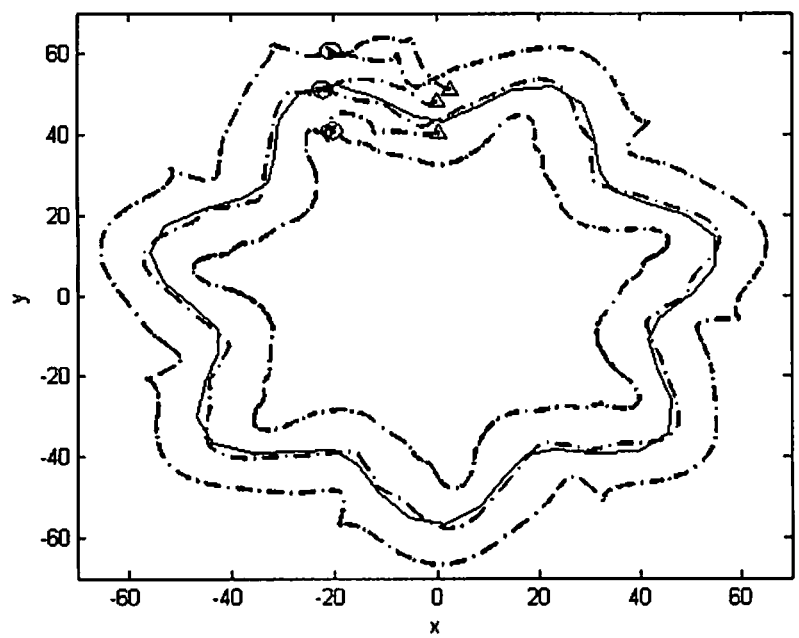

Simulations:

We illustrate the proposed control strategy given by Eq. (3) and Eq. (4) with the following simulation results. FIG. 2A shows the trajectories of three robots tracking a sinusoidal boundary while FIG. 2B shows the team tracking a 1D star-shaped boundary. We note that throughout the entire length of the simulation, the team maintains a saddle straddle formation across the boundary.

In both examples, $u=-a\nabla\phi-b\nabla\times\psi$ where $a,b>0$ and $\phi(x)$ is an artificial potential function such that $\phi(x)=0$ for all $x\in B_*$ and $\phi(x)<0$ for any $x\in R^2/B_*$. The vector $\psi$ is a 3×1 vector whose entries are given by $[0,0,\gamma(x,y)]^T$ where $\gamma(x,y)$ is the curve describing the desired boundary. Lastly, the estimated position of the boundary is given by the position of the tracking robot, i.e., robot C. In these examples, we filtered the boundary position using a simple first-order low pass filter.

Experiments

Figure 3A:
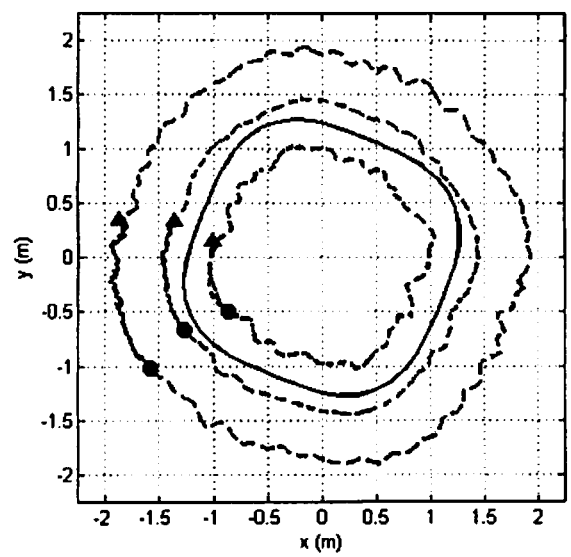
FIGS. 3A-B show trajectories of a 3 robot team tracking a star shape (FIG. 3A) and a snapshot of the multi-robot experiment (FIG. 3B) according to the invention.
Figure 3B:
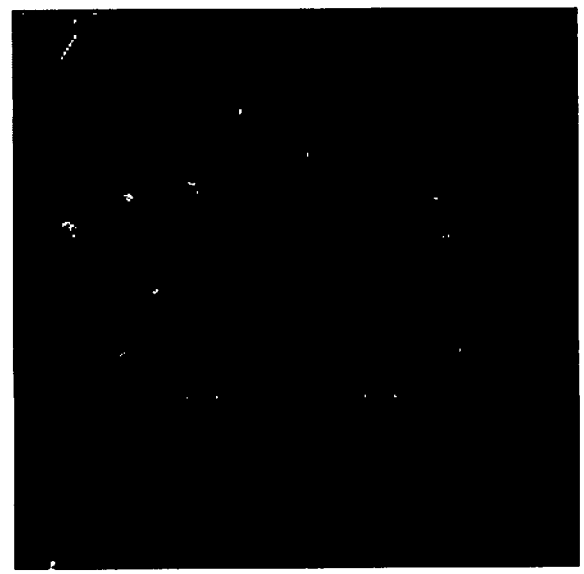

We also implemented the control strategy on our multi-robot testbed. The testbed consisted of three mSRV-1 robots in a 4.8×5.4 meter workspace. The mSRV-1 are differential-drive robots equipped with an embedded processor, color camera, and 802.11 wireless capability. Localization for each robot was provided via a network of overhead cameras. FIG. 3A shows the trajectories of the robots tracking a star shaped boundary. FIG. 3B is a snapshot of the experimental run.

Extension to Periodic Boundaries

Next, we consider the system of 3 robots with kinematics given by Eq. (1) where $u_i$ is determined by the wind-driven double-gyre flow model with noise $$\dot{x} = -\pi A \sin\left(\pi \frac{f(x,t)}{s}\right)\cos\left(\pi \frac{y}{s}\right) - \mu x + \eta_1(t). \tag{5a}$$

$$\dot{y} = \pi A \cos\left(\pi \frac{f(x,t)}{s}\right)\sin\left(\pi \frac{y}{s}\right)\frac{df}{dx} - \mu y + \eta_2(t), \tag{5b}$$

$$f(x,t) = \varepsilon\sin(\omega t + \psi)x^2 + (1 - 2\varepsilon\sin(\omega t + \psi))x. \tag{5c}$$

Figure 4:
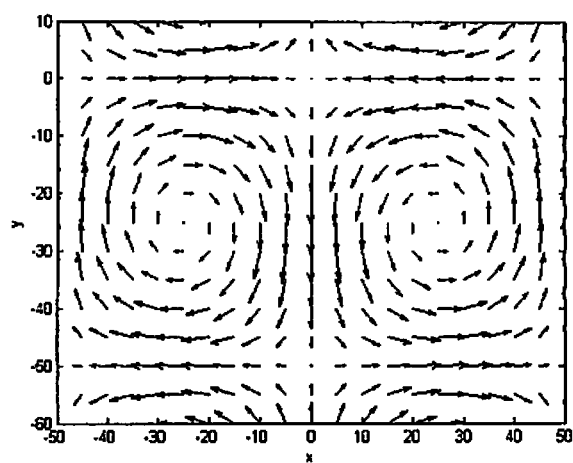
FIG. 4 shows a phase portrait of a time-independent double-gyre model according to the invention.
Figure 5A:
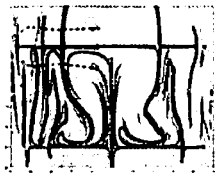
FIGS. 5A-5H show snapshots of the trajectories of the team of 3 robots tracking Lagrangian coherent structures according to the invention.
Figure 5B:
Figure 5C:
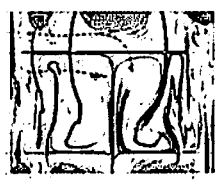
Figure 5D:
Figure 5E:
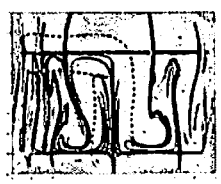
Figure 5F:
Figure 5G:
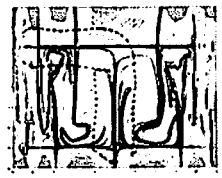
Figure 5H:

When $\epsilon=0$, the double-gyre flow is time-independent, while for $\epsilon\neq 0$, the gyres undergo a periodic expansion and contraction in the x direction. In Eq. (5a-c), A approximately determines the amplitude of the velocity vectors, $\omega/2\pi$ gives the oscillation frequency, $\epsilon$ determines the amplitude of the left-right motion of the separatrix between the gyres, $\psi$ is the phase, $\mu$ determines the dissipation, s scales the dimensions of the workspace, and $\eta_i(t)$ describes a stochastic white noise with mean zero and standard deviation $\sigma=\sqrt{2I}$, for noise intensity I. In this work, $\eta_i(t)$ can be viewed as either measurement or environmental noise. FIG. 4 shows the phase portrait of the time-independent double-gyre model.

FIGS. 5A-5H show trajectories of the team of 3 robots tracking Lagrangian coherent structures of the system described by Eq. (5a-c) with A=10, $\mu$=0.005, $\epsilon$=0.1, $\psi$=0, I=0.01, and s=50. The trajectories of the straddling robots are shown in black and the estimated LCS is shown in white.

While the present invention has been described with respect to exemplary embodiments thereof, it will be understood by those of ordinary skill in the art that variations and modifications can be effected within the scope and spirit of the invention. For example, the invention may be applied to any designated fluid medium where sensors may communicate and take local position measurements, including but not limited to autonomous air vehicle sensors operating in air where sensors may communicate and take local position measurements. Also, instead of employing AUVs, mobile autonomous underwater flow sensors may be deployed with each sensor tethered to an autonomous watersurface craft.

The invention claimed is:

1. A collaborative control method for tracking Lagrangian coherent structures (LCSs) and manifolds on flows using at least three autonomous sensors each equipped with a local flow sensor for sensing flow in an air medium, and wherein a first flow sensor is a tracking sensor and the other sensors are herding sensors for controlling and determining the actions of the tracking sensor, comprising: deploying the sensors in the air medium whereby the tracking sensor is positioned with respect to the herding sensors such that the herding sensors maintain a straddle formation across a boundary; obtaining a local fluid flow velocity measurement from each sensor; and based on the local flow velocity measurements predicting a global fluid flow coherent structure.

2. The method of claim 1, wherein a straddling control strategy is given by $$V_i = \begin{cases} 0 & \text{if } d_{Min} < \|x_i - x_C\| < d_{Max} \\ \|(p_i - x_i) - u_i\| & \text{otherwise,} \end{cases} \tag{3a}$$

$$\theta_i = \begin{cases} 0 & \text{if } d_{Min} < \|x_i - x_C\| < d_{Max} \\ \alpha_i & \text{otherwise.} \end{cases} \tag{3b}$$

where $d_{Max}$ is a maximum allowable separation distance of a pair of straddling robots L and R from a control robot C., an objective is to navigate to a point $p_i$ on a current projected saddle straddle line segment $\hat{J}_t$ such that, $\|p_i - p_C\| = d_{Min}$ and $p_C$ denotes the midpoint of $\hat{J}_t$, and $\alpha_i$ is an angle between a desired, $(p_i - x_i)$, and a current heading $u_i$ of a robot i.

3. A collaborative control method for tracking Lagrangian coherent structures (LCSs) and manifolds on flows using at least three mobile autonomous underwater flow sensors, and wherein a first flow sensor is a tracking sensor and the other sensors are herding sensors for controlling and determining the actions of the tracking sensor, and wherein the sensors are each tethered to an autonomous watersurface craft, comprising:

deploying the sensors in a body of water whereby the tracking sensor is positioned with respect to the herding sensors such that the herding sensors maintain a straddle formation across a boundary;

obtaining a local flow velocity measurement from each sensor; and based on the local flow velocity measurements predicting a global flow structure useful for plotting an optimal course for a vessel between two or more locations.

4. The method of claim 3, wherein a straddling control strategy is given by $$V_i = \begin{cases} 0 & \text{if } d_{Min} < \|x_i - x_C\| < d_{Max} \\ \|(p_i - x_i) - u_i\| & \text{otherwise,} \end{cases} \tag{3a}$$

$$\theta_i = \begin{cases} 0 & \text{if } d_{Min} < \|x_i - x_C\| < d_{Max} \\ \alpha_i & \text{otherwise.} \end{cases} \tag{3b}$$

where $d_{Max}$ is a maximum allowable separation distance of a pair of straddling robots L and R from a control robot C., an objective is to navigate to a point $p_i$ on a current projected saddle straddle line segment $\hat{J}_t$ such that, $\|p_i - p_C\| = d_{Min}$ and $p_C$ denotes the midpoint of $\hat{J}_t$, and $\alpha_i$ is an angle between a desired, $(p_i - x_i)$, and a current heading $u_i$ of a robot i.

* * * * *